May 31, 1938.   R. J. PRATT   2,119,287
PNEUMATIC TIRE GAUGE
Filed Oct. 19, 1936   3 Sheets-Sheet 1
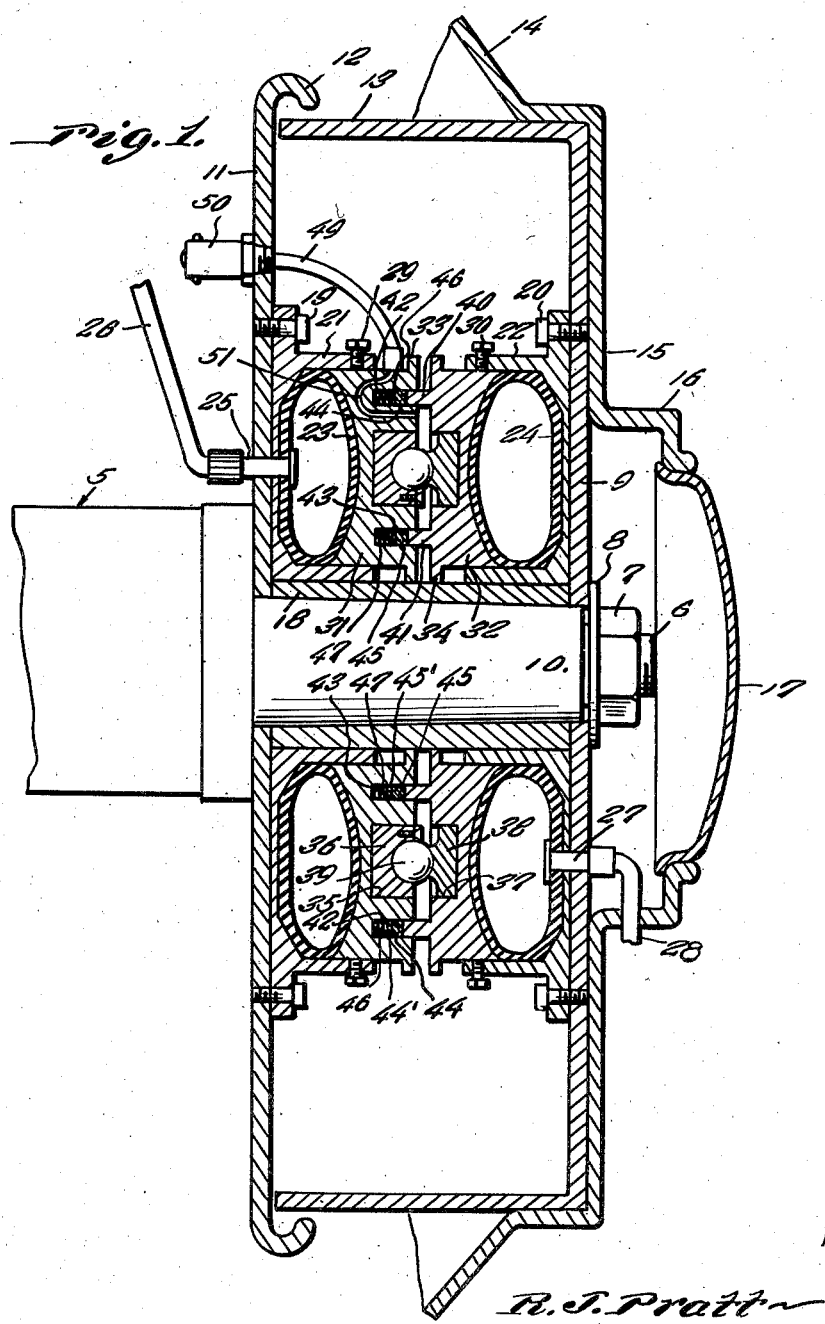
Inventor
R. J. Pratt
By Clarence A. O'Brien
Hyman Berman
Attorneys May 31, 1938.  R. J. PRATT  2,119,287
PNEUMATIC TIRE GAUGE
Filed Oct. 19, 1936  3 Sheets-Sheet 2
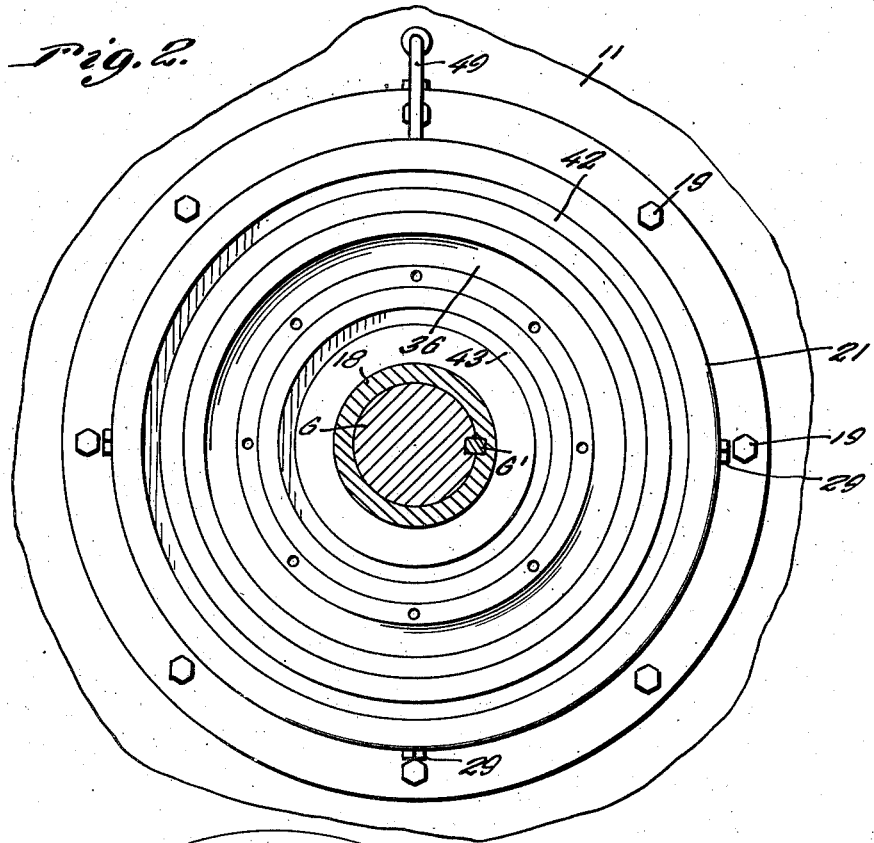
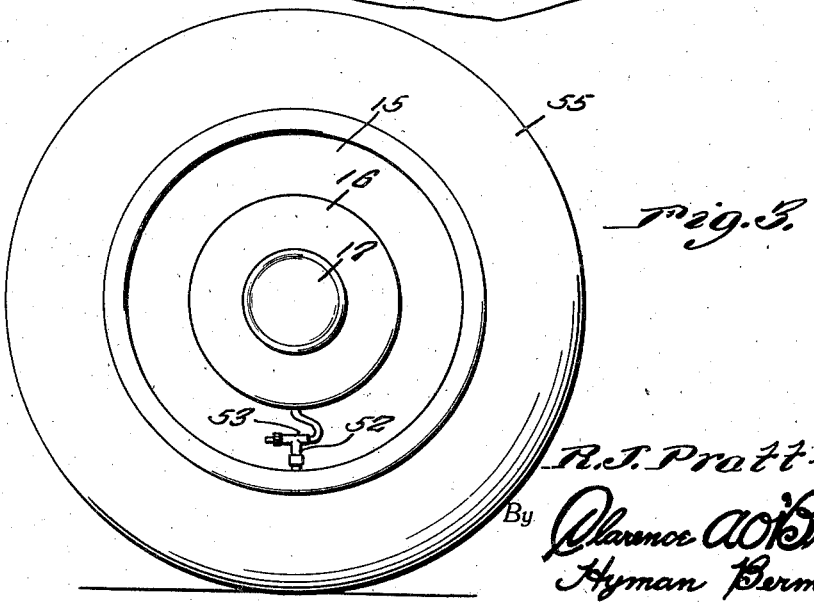
Inventor
R. J. Pratt
By Clarence A. O'Brien
Hyman Berman
Attorneys May 31, 1938.  R. J. PRATT  2,119,287
PNEUMATIC TIRE GAUGE
Filed Oct. 19, 1936  3 Sheets-Sheet 3
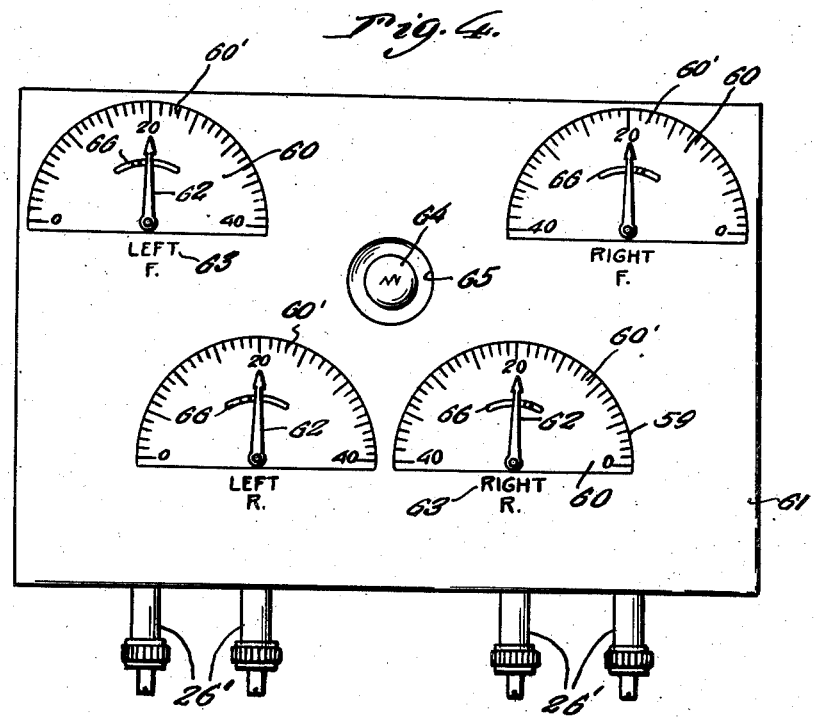
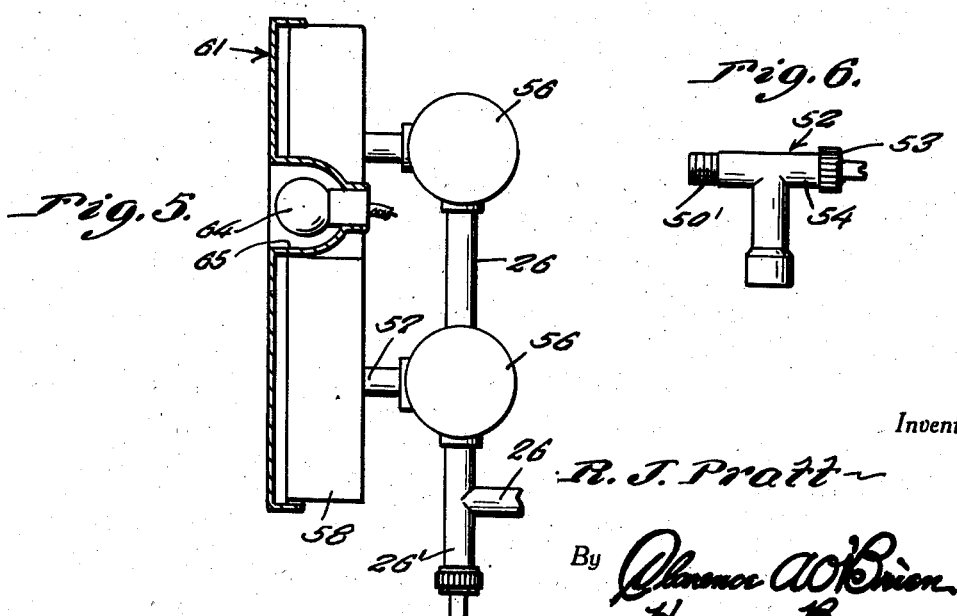
Inventor
R. J. Pratt
By Clarence A. O'Brien
Hyman Berman
Attorneys Patented May 31, 1938

2,119,287

UNITED STATES PATENT OFFICE 2,119,287

PNEUMATIC TIRE GAUGE

Robert James Pratt, Cochrane, Alberta, Canada

Application October 19, 1936, Serial No. 106,467

4 Claims. (Cl. 73—31)

My invention relates generally to means for gauging the pressure within automatic tires, and particularly to gauge structure to be incorporated in automobile and similar pneumatic tired wheels, whereby the pressure in that particular wheel can be exhibited on the instrument panel of the automobile or the like, and an important object of the invention is to provide wheel structure of the character indicated which instantly shows whether or not the pressure in the tire of the particular wheel is at the desired level, while the automobile or other vehicle is traveling over the ground or while the same is standing still.

Another important object of my invention is to provide an entirely pneumatic arrangement of the character indicated above wherein the pressure in the particular tire is transmitted directly to pressure operated indicators located on the instrument panel of the automobile.

Other important objects of my invention will be apparent from a reading of the following description taken in connection with the drawings, wherein for purposes of illustration I have set forth a preferred embodiment of my invention.

In the drawings:—

Figure 1 is a vertical longitudinal sectional view taken through an embodiment of the invention.

Figure 2 is a transverse vertical sectional view taken through Figure 1 approximately centrally.

Figure 3 is an elevational view of the outboard side of the wheel structure.

Figure 4 is an elevational view of the indicating panel to be mounted on the instrument panel or the like.

Figure 5 is a transverse vertical sectional view taken through Figure 4 approximately centrally.

Figure 6 is an elevational view of one of the two way inflating valves for the tire.

Referring in detail to the drawings, the numeral 5 generally designates the usual axle housing from which extends the axle spindle 6 having the wheel holding nut 7 and the washer 8 clamped against the drum portion 9 of the wheel which rides on the bearing 10 which is circumposed on the spindle 6, the axle housing 5 having the brake drum shield 11 fixed stationary with respect to the axle housing and having the outturned lip 12 projecting over the inboard edge of the brake drum annulus 13 from which projects the spoke or disk portion 14 of the wheel which includes an overhanging portion 15 forming the annular housing 16 in which the hub cap 17 is conventionally attached.

In accordance with the present invention a tube 18 is fitted around the bearing 10 and on the exterior of this tube 18 and by means of the bolts 19 and 20, respectively, are supported the U-shaped cross-section annuli 21 and 22, respectively, and along the bight portion and the inner portion of the legs thereof are confined flexible pneumatic tubes 23 and 24, respectively, the tube 23 having an open stem 25 leading through the shield 11 and having connection to a pipe 26. The pneumatic tube 24 has an open stem 27 which has connection to a pipe 28.

The radially outward arm of each U-shaped annulus 21, 22 has therein a series of set screws 29, 30 which work in grooves in the radially outward side of annular blocks 31 and 32 which are slidably mounted within the arms of the respective annuli 21 and 22, whereby the annular blocks 31 and 32 are prevented from moving too far inboardly and outboardly with respect to the shield 11 and the housing 9. Flanges 33 and 34 on the facing ends of the annular blocks 31 and 32 act as stops for the ends of the arms of the U-shaped annuli 21 and 22 and the radially inward side of these flanges slide on the exterior of the tube 18.

Set in a annular opening 35 in the annular block 31 is a removable ball bearing race 36 and in a similar but shallower opening 37 in the face of the annular block 32 is a ball bearing race 38 and these races confine a series of ball bearings 39 by whose presence the relative movement of the annular block 32 relative to the annular block 31 is made practically frictionless during the rotation of the wheel relative to the axle housing.

Extending from the inboard face of the annular block 32 are annular projections 40 and 41 which project into accommodating annular grooves 42 and 43 in the face of the annular block 31 and in these grooves are felt washers 44 and 45 backed by thin steel rings 44' and 45' behind which are springs 46 and 47 pushing the washers into engagement with the projections 40 and 41, whereby an oil-tight relation of the annular blocks 31 and 32 is maintained with respect to the lubrication of the ball bearings, which lubrication is effected by the presence of the lubricating tube 49 having the fitting 50 mounted on the shield 11 and having the passage 51 leading through the annular block 31 to the space between the annular ribs 40 and 41 so as to reach the ball bearing structure with the lubricant.

The tube 28 leading from the outboard pneumatic tube 24 leads to the end 50' of the T- shaped two-way valve 52 and on the opposite end of the head is the cap 53 which closes the inflating end 54 of this valve. The valve 52 is screwed in place on the usual stem of the pneumatic tire 55.

The tube 26 leads to one of the air bells or pockets 56 which has connection 57 to the corresponding one of the pressure meters 58 each one of which has a face 60 with indicia 60' on the panel 61 across which is operated the corresponding pointer 62. Each face 60 is provided with a designation 63 indicating to which of the four tires of the automobile or other vehicle the indication has reference. A deflation signalling bulb 64 in a socket 65 in the panel 61 is provided to indicate when one or more of the tires is deflated. As indicated in Figure 4 a separate face 60 is provided for each one of the tires of the vehicle and a corresponding tube 26 leads to the tube 23 of the corresponding tire or wheel. Each of these tubes has an inflating valve 26' by means of which the desired air pressure is placed in the tubes 23.

There is no pneumatic connection between the tubes 23 and 24 in the gauge mechanism. The corresponding meter 58 is operated to show either inflation or deflation by the exertion of pressure thereon or by the relaxing of pressure thereon by the annular block 31, and pressure for operating the block 31 is applied by the movement of the annular block 32 under the compulsion or under the relaxation of the tube 24, which tube 24 is connected by the tube 28 to the interior of the tire 55. Thus if the pressure in the tire 55 should go down below the predetermined desired level, the tube 24 will relax and the tube 23 which was until the condition of under inflation of the tire compressed, will expand proportionately and the pressure on the corresponding gauge 58 will be correspondingly relaxed so that the pointer will move in the under inflation direction. The opposite action of the device takes place when over-inflation of the tire 55 exists.

Each of the pointers 62 moves relative to an electrical contact 66 which is concentrically mounted on the face 60 of the corresponding pressure meter, as shown in Figure 4, and in such a position that the pointer 62 will engage the same and close a circuit only in an underinflated condition of the corresponding tire. Suitable arrangements are provided whereby the switches thus constituted are placed in circuit with the battery circuit of the automobile for lighting the deflation signal bulb 64 whenever one or more of the tires becomes deflated, whereby the driver of the automobile is warned of this condition before starting the automobile and immediately upon closing the ignition switch, which is interposed in the circuit for this purpose.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. Vehicle wheel structure comprising an axle housing including a drum shield stationary with said axle housing, an axle spindle projecting from said axle housing, a wheel on said spindle including a pneumatic tire and a brake drum and revoluble relative to said drum shield, a first guide fastened to said drum shield, a second guide fastened to said brake drum, said guides being annular and having channels facing each other, a first pneumatic tube confined by the channel of said first guide, a second pneumatic tube confined by the channel of said second guide, an individual pressure gauge to which said first pneumatic tube is connectible, said second tube being connected in communication with the pneumatic tire, and annular slides axially slidably confined in the channels of the respective guides and axially slidable relative to each other and to said guides, said annular slides being located at the axially inward sides of and engaging the respective pneumatic tubes, annular cooperating rib means and rib receiving recess means on the facing sides of said annular slides.

2. Vehicle wheel structure comprising an axle housing including a drum shield stationary with said axle housing, an axle spindle projecting from said axle housing, a wheel on said spindle including a pneumatic tire and a brake drum and revoluble relative to said drum shield, a first guide fastened to said drum shield, a second guide fastened to said brake drum, said guides being annular and having channels facing each other, a first pneumatic tube confined by the channel of said first guide, a second pneumatic tube confined by the channel of said second guide, an individual pressure gauge to which said first pneumatic tube is connectible, said second tube being connected in communication with the pneumatic tire, and annular slides confined in the channels of the respective guides and axially slidable relative to each other and to said guides and engaging the axially inward sides of the respective pneumatic tubes, axially and circumferentially extending rib means and recess means on said slides, said rib means and said recess means being mutually engaged for axial and rotary relative movement, and spring means in said recess means urging said slides apart in opposite axial directions.

3. Vehicle wheel structure comprising an axle housing including a drum shield stationary with said axle housing, an axle spindle projecting from said axle housing, a wheel on said spindle including a pneumatic tire and a brake drum and revoluble relative to said drum shield, a first guide fastened to said drum shield, a second guide fastened to said brake drum, said guides being annular and having channels facing each other, a first pneumatic tube confined by the channel of said first guide, a second pneumatic tube confined by the channel of said second guide, an individual pressure gauge to which said first pneumatic tube is connectible, said second tube being connected in communication with the pneumatic tire, annular slides confined in the channels of the respective guides and axially slidable relative to each other and to said guides and engaging the axially inward sides of the respective pneumatic tubes, the facing sides of said annular slides having mutually engaging rib means and recess means, said rib means comprising at least two concentric annuli projecting axially and said recess means comprising at least two annular grooves individually receiving said annuli.

4. Vehicle wheel structure comprising an axle housing including a drum shield stationary with said axle housing, an axle spindle projecting from said axle housing, a wheel on said spindle including a pneumatic tire and a brake drum and revoluble relative to said drum shield, a first guide fastened to said drum shield, a second guide fastened to said brake drum, said guides being annular and having channels facing each other, a first pneumatic tube confined by the channel of said first guide, a second pneumatic tube confined by the channel of said second guide, an individual pressure gauge to which said first pneumatic tube is connectible, said second tube being connected in communication with the pneumatic tire, annular slides confined in the channels of the respective guides and axially slidable relative to each other and to said guides and engaging the axially inward sides of the respective pneumatic tubes, the facing sides of said annular slides having mutually engaging rib means and recess means, said rib means comprising at least two concentric annuli projecting axially and said recess means comprising at least two annular grooves individually receiving said annuli, a lubricant sealing ring in each of said grooves and slidably engaging the corresponding annulus within its groove, and spring means in the groove behind the lubricant sealing ring and holding the same in sealing position.

ROBERT J. PRATT.